United States Patent
Ehrmann et al.

(10) Patent No.: US 12,454,249 B2
(45) Date of Patent: Oct. 28, 2025

(54) CLEANING APPARATUS, ROOF MODULE AND METHOD FOR CLEANING A VIEWING AREA OF A MOTOR VEHICLE

(71) Applicant: Webasto SE, Stockdorf (DE)

(72) Inventors: Maximilian Ehrmann, Stockdorf (DE); Magnus Sviberg, Stockdorf (DE); Andreas Maier, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 392 days.

(21) Appl. No.: 18/176,024

(22) Filed: Feb. 28, 2023

(65) Prior Publication Data

US 2023/0278528 A1 Sep. 7, 2023

(30) Foreign Application Priority Data

Mar. 7, 2022 (DE) ................. 10 2022 105 303.2

(51) Int. Cl.
 *B60S 1/46* (2006.01)
 *B60S 1/66* (2006.01)
 *B62D 25/00* (2006.01)

(52) U.S. Cl.
 CPC . *B60S 1/46* (2013.01); *B60S 1/66* (2013.01); *B62D 25/00* (2013.01)

(58) Field of Classification Search
 CPC .... B60S 1/46; B60S 1/56; B60S 1/566; B60S 1/481; B60S 1/486; B60S 1/52; B60S 1/54; B60S 1/548; B60S 1/66; B62D 25/00; B62D 25/06
 See application file for complete search history.

(56) References Cited

U.S. PATENT DOCUMENTS

| 11,965,969 B2 * | 4/2024 | Hahn | G01S 17/931 |
| 2005/0040674 A1 * | 2/2005 | VanIterson | B60S 1/52 |
| | | | 296/192 |

(Continued)

FOREIGN PATENT DOCUMENTS

| CN | 111013838 A * | 4/2020 | B05B 1/00 |
| CN | 114643958 A * | 6/2022 | B60S 1/52 |

(Continued)

OTHER PUBLICATIONS

Examination report in companion application in Germany dated Nov. 18, 2022 (12 pages which includes machine translation into English).

*Primary Examiner* — Hilary L Gutman
(74) *Attorney, Agent, or Firm* — Fitch, Even, Tabin & Flannery, LLP (57) ABSTRACT

A cleaning apparatus for cleaning at least one viewing area of a motor vehicle, the cleaning apparatus may have at least one cleaning nozzle and an evaluation and control apparatus. The evaluation and control apparatus is configured to receive at least one sensor signal which comprises at least one piece of information on a motor vehicle environment condition and/or a motor vehicle parameter, to evaluate this information in order to determine an operation situation in this manner, to select a predetermined cleaning profile from a plurality of predefined cleaning profiles based on this information, and to control the at least one cleaning nozzle depending on the selected cleaning profile in order to clean the at least one viewing area.

11 Claims, 2 Drawing Sheets

(56) References Cited

U.S. PATENT DOCUMENTS

| | | | |
|---|---|---|---|
| 2006/0202516 A1* | 9/2006 | Mori | B60S 1/52 296/192 |
| 2015/0066293 A1* | 3/2015 | Davies | B60S 1/481 701/36 |
| 2016/0297406 A1 | 10/2016 | Jansen et al. | |
| 2019/0168718 A1 | 6/2019 | Kiyama et al. | |
| 2020/0180567 A1* | 6/2020 | Sakai | B60S 1/485 |
| 2021/0086727 A1* | 3/2021 | Bopp | B08B 3/02 |
| 2022/0041173 A1* | 2/2022 | Sennott | G01S 13/931 |
| 2022/0289146 A1* | 9/2022 | Huelsen | B60S 1/56 |
| 2023/0008767 A1* | 1/2023 | Langlais | B62D 25/06 |
| 2023/0074027 A1* | 3/2023 | Ehrmann | B60S 1/56 |
| 2023/0144240 A1* | 5/2023 | Huelsen | G01S 7/4813 296/210 |
| 2023/0256941 A1* | 8/2023 | Sviberg | B60R 11/04 239/284.1 |
| 2024/0092316 A1* | 3/2024 | Ehrmann | B60S 1/52 |
| 2024/0190389 A1* | 6/2024 | Kroneck | B60S 1/56 |
| 2024/0367615 A1* | 11/2024 | Sviberg | B60S 1/544 |
| 2024/0367619 A1* | 11/2024 | Ehrmann | B60S 1/54 |
| 2024/0375616 A1* | 11/2024 | Sviberg | B60S 1/54 |
| 2025/0102679 A1* | 3/2025 | Braley | B60W 60/001 |

FOREIGN PATENT DOCUMENTS

| | | | | |
|---|---|---|---|---|
| DE | 102013225972 A1 | | 4/2019 | |
| DE | 112017003630 T5 | * | 4/2019 | B60S 1/485 |
| DE | 102019118724 A1 | * | 1/2021 | B60S 1/522 |
| DE | 102019122202 A1 | * | 2/2021 | G06V 20/56 |
| EP | 4015319 A1 | * | 6/2022 | B60S 1/02 |
| FR | 2993526 A1 | * | 1/2014 | B60S 1/486 |
| JP | 11180264 A | * | 7/1999 | |
| JP | 2014008868 A | * | 1/2014 | B60S 1/56 |
| JP | 2018012385 A | * | 1/2018 | B60S 1/485 |
| WO | WO-2018230255 A1 | * | 12/2018 | B60S 1/603 |
| WO | WO-2022263323 A1 | * | 12/2022 | B60S 1/46 |
| WO | WO-2023030809 A1 | * | 3/2023 | B60S 1/52 |

* cited by examiner

CLEANING APPARATUS, ROOF MODULE AND METHOD FOR CLEANING A VIEWING AREA OF A MOTOR VEHICLE

CROSS-REFERENCE TO RELATED APPLICATION

This application claims priority from German Patent Application Number 10 2022 105 094.7, filed on Mar. 3, 2022, which is hereby incorporated herein by reference in its entirety for all purposes.

FIELD

The invention relates to a cleaning apparatus for cleaning at least one viewing area of a motor vehicle, in particular a passenger car, according to the preamble of claim 1. Furthermore, the invention relates to a roof module having at least one cleaning apparatus of this kind. The invention also relates to a method for cleaning a viewing area.

BACKGROUND

Generic cleaning apparatuses are used, for example, in motor vehicles and in roof modules for motor vehicles of this kind in order to clean viewing areas, such as a windshield and/or a rear window and/or a viewing area of an environment sensor.

Generic roof modules are widely used in vehicle manufacturing since these roof modules can be prefabricated as separate functional modules and can be delivered to the assembly line when assembling the vehicle. The roof module forms at least sections of a roof cladding of the vehicle roof at its outer surface, the roof cladding preventing moisture and air flows from entering the vehicle interior. The roof cladding is composed of one or more panel components, which can be made of a stable material, such as painted metal or painted or solid-colored plastic. The roof module can be a part of a fixed vehicle roof or a part of an openable roof sub-assembly.

Furthermore, the development in vehicle manufacturing is increasingly focusing on autonomously and semi-autonomously driving motor vehicles. In order to enable the vehicle controller to control the motor vehicle autonomously or semi-autonomously, a plurality of environment sensors (e.g., lidar sensors, radar sensors, (multi-) cameras, etc. including other (electrical) components) are employed, which are integrated in the roof module, for example, and which chart the environment surrounding the motor vehicle and determine, for example, a current traffic situation from the acquired environment data. Roof modules which are equipped with a plurality of environment sensors are also known as roof sensor modules (RSM). The known environment sensors transmit and/or receive electromagnetic signals, such as laser beams or radar beams, allowing a data model of the vehicle environment to be generated by signal evaluation and to be used for controlling the vehicle.

The environment sensors for monitoring and charting the vehicle environment are typically mounted on the vehicle roof since the vehicle roof is typically the highest point of a vehicle, from where the vehicle environment is easily visible. The environment sensors are typically placed on top of the panel component of the roof module, which forms the roof cladding, as attachments. During use of the environment sensor, there exists a risk due to environment influences (e.g., weathering) of a viewing area transparent or partially transparent to the environment sensor becoming dirty and a signal acquisition of the environment becoming hindered by this or, in the worst case, the viewing area no longer being transparent to the environment senor.

To clean the viewing area, the use of generic cleaning apparatuses as described above is known. Similar to spray nozzles of a windshield or headlight wiper system, these cleaning apparatuses are disposed in an area of the roof module in front of the corresponding viewing area. A watery soap solution or a compressed gas, such as pressurized air, can be sprayed as the cleaning fluid, for example; cleaning with pressurized air as opposed to a watery soap solution has the advantage that no cleaning water has to be diverted from the cleaned surface and/or the roof module after cleaning.

In the state of the art, a cleaning process for cleaning a viewing area is often actively controlled by a vehicle occupant, as is also known from cleaning the windshield and/or rear window and/or headlights. The vehicle occupant activates the cleaning apparatus, for example manually via a lever and/or a control element, whereby a cleaning process is started. In most cases, the cleaning process continues until the occupant releases the control element and/or a predetermined period of time has elapsed. It is also known to indicate to the occupant that cleaning of a certain viewing area is necessary due to a determined degree of contamination, so that the occupant can activate the cleaning process in response. It is also known to automatically activate cleaning depending on a determined degree of contamination of the viewing area, similar to what is already known for the activation of windshield wipers as a rule.

Both the automatic and the manual activation of known cleaning apparatuses have the disadvantage that the cleaning does not take place optimally under all ambient conditions, meaning no optimal cleaning result can be achieved depending on the ambient conditions and/or driving situation. Thus, in the state of the art, it is possible, especially under varying environmental conditions, that dirt residue remains on the corresponding viewing area after a cleaning process has been carried out. This makes it necessary to repeat the cleaning process, which can lead to an excessive increase in the amount of cleaning fluid required. This in turn increases the costs incurred for cleaning. In addition, insufficient cleaning has a negative effect on the availability of an environment sensor in question, so that vehicle safety is also negatively affected.

SUMMARY

Due to the disadvantages mentioned above, an object of the invention lies in proposing a cleaning apparatus and/or a roof module and/or a method for cleaning a viewing area of a motor vehicle, via any of which the disadvantages from the state of the art mentioned above are reduced and in particular optimized cleaning of a viewing area can take place.

Advantageous embodiments of the invention are the subject matter of the dependent claims. Moreover, any and all combinations of at least two features disclosed in the description, the claims, and/or the figures fall within the scope of the invention. Naturally, the explanations given in connection with the cleaning apparatus equivalently relate to the roof module and/or the motor vehicle according to the invention and vice-versa, without being mentioned separately in its context. Equally, all features and exemplary embodiments disclosed in connection with the cleaning apparatus relate to the method according to the invention, albeit not verbatim. In particular, linguistically common rephrasing and/or an analogous replacement of respective terms within the scope of common linguistic practice, in particular the use of synonyms backed by the generally recognized linguistic literature, are of course comprised by the content of the disclosure at hand without every variation having to be expressly mentioned.

The cleaning apparatus according to the invention for cleaning at least one viewing area of a motor vehicle comprises at least one cleaning nozzle and an evaluation and control apparatus. The cleaning apparatus is characterized in that the evaluation and control apparatus is configured to receive at least one sensor signal which comprises at least one piece of information on a vehicle environment condition and/or a motor vehicle parameter, to evaluate this information in order to determine an operation situation in this manner, to select a predetermined cleaning profile from a plurality of predefined and/or predetermined and/or previously used cleaning profiles based on this information, and to control the at least one cleaning nozzle depending on the selected cleaning profile in order to clean the at least one viewing area.

In another aspect, the invention relates to a roof module for forming a vehicle roof on a motor vehicle having a panel component, which forms at least sections of a roof cladding of the vehicle roof, the roof cladding functioning as an outer sealing surface of the roof module, the motor vehicle having at least one environment sensor which is configured to transmit and/or to receive electromagnetic signals via a viewing area in order to chart a vehicle environment in this manner, and at least one cleaning apparatus according to any embodiment of the invention at hand, which is configured to clean the viewing area.

The invention also relates to a motor vehicle having a vehicle chassis and at least one roof module of this kind, which is disposed on, in particular glued to, the vehicle chassis as a structural unit.

In another aspect, the invention relates to a method for cleaning at least one viewing area of a motor vehicle, the method comprising the following steps: receiving at least one sensor signal which comprises at least one piece of information on a motor vehicle environment condition and/ or a motor vehicle parameter; evaluating the at least one sensor signal in order to determine a vehicle situation in this manner; selecting a predetermined cleaning profile from a plurality of predefined cleaning profiles based on the determined operation situation; and controlling at least one cleaning nozzle depending on the selected cleaning profile in order to clean the at least one viewing area in this manner.

According to the invention, a cleaning process for cleaning a viewing area is individually, in particular adaptively adapted by selecting the cleaning profile based on the operation situation according to the determined operation situation. This allows optimized cleaning of the viewing area according to the situation, whereby in particular a second cleaning which was otherwise required for an insufficient cleaning performance is no longer necessary. This allows saving a lot of required cleaning fluid. This leads to cleaning costs being reduced and in particular to a reliability of the environment sensor and/or other electric and/or electronic and/or electromagnetic components, which can all transmit and/or receive electromagnetic signals via the viewing area to be cleaned, being increased. In other words, a corresponding cleaning process, specifically the cleaning sequence, is adapted to the actual operational and/or environmental conditions in order to enable an optimal cleaning process. According to the invention, particularly preferably signals and/or sensor signals are registered by sensors available in motor vehicles for this purpose and transmitted to and/or received by the evaluation and control apparatus. The evaluation and control apparatus then determines a corresponding operation situation image in which information regarding the vehicle interior and/or exterior is processed. Based on this operation situation image the cleaning profile is selected. Based on the cleaning profile, the cleaning process is controlled so that the corresponding cleaning sequence is adapted to the corresponding operation situation. Additionally, the invention allows using a used cleaning fluid, in particular water and/or a watery soap solution and/or an in particular pressurized gas, optimally according to the situation. Thus, an optimal use, in particular a reduced amount of the cleaning medium, is enabled. This leads to servicing intervals, in particular for refilling the cleaning medium and/or the cleaning fluid, being extended.

The cleaning apparatus according to the invention can be used particularly preferably for cleaning a windshield and/or a rear window and/or a headlight and/or a viewing area of an environment sensor and/or any other electrical and/or electronic and/or electromagnetic component disposed on or integrated in a motor vehicle when used as intended. Preferably, a motor vehicle comprises several cleaning apparatuses according to the invention.

The determined operation situation preferably comprises a plurality of information on a plurality of motor vehicle environment conditions and/or a plurality of motor vehicle parameters. Preferably, the corresponding determined operation situation can be understood as an individual parameter constellation of parameters which are recorded by sensors and received by the evaluation and control apparatus. The at least one piece of information on the at least one motor vehicle environment condition preferably pertains to a physical area outside of the motor vehicle, i.e., a vehicle environment. The piece of information on the at least one motor vehicle parameter pertains to the motor vehicle itself and/or to a corresponding operating state and/or an operation mode of the motor vehicle. Preferably, the operation situation is determined at least in predetermined temporal intervals, particularly preferably in real time, by the evaluation and control apparatus, meaning cleaning adapted to the current operation situation is enabled.

A cleaning profile preferably comprises at least one, particularly preferably a plurality, of control commands, via which an in particular individualized control of the at least one cleaning nozzle is enabled. The cleaning profile can also be a cleaning sequence, in particular a temporal sequence of consecutive control commands for controlling the at least one cleaning nozzle. Particularly preferably, the cleaning apparatus according to the invention and/or the roof module according to the invention and/or a motor vehicle comprises plurality of cleaning nozzles, which preferably can each be controlled individually in particular via the evaluation and control apparatus according to the invention and can be controlled via the method according to the invention.

In what manner a sensor signal is provided to the evaluation and control apparatus is generally arbitrary. For instance, the at least one sensor signal can be transmitted to the evaluation and control apparatus via one or more cables or wirelessly. Preferably, the at least one sensor signal can also comprise multichannel information on the corresponding detection parameter so that preferably a multidimensional evaluation of the detection parameter is made possible via the evaluation and control apparatus. Preferably, the evaluation and control apparatus comprises at least one processor and/or a temporary memory and/or a non-volatile memory and/or a graphic processing apparatus and/or at least one processing circuit, via which the electric and/or electromagnetic signals can be processed.

Generally, the viewing area can be a window and/or a lens and/or a headlight casing and/or a pane (for example around a windshield and/or a rear window), which is disposed on a motor vehicle and, for example, is at least partially transparent or entirely transparent for a predetermined electromagnetic radiation. The viewing area can preferably be made of a plastic or glass or any other at least partially transparent working material. Generally, it is possible is inserted into an opening of the panel component of the roof module according to the invention as a window or lens, for example, the at least one environment sensor looking through the window or lens in order to chart the vehicle environment. Alternatively or additionally, it is also possible for the viewing area to be formed integrally in a panel component of this kind.

In a preferred embodiment, the at least one sensor signal comprises at least one piece of information on an ambient temperature and/or an ambient humidity and/or an ambient topography, for example an ambient incline, and/or a wind speed and/or a wind direction and/or an intensity of solar radiation and/or an aerosol concentration and/or a degree of soiling (examples for motor vehicle environment conditions) and/or a geographical position and/or a motor vehicle speed and/or an motor vehicle acceleration (examples for motor vehicle parameters). Preferably, motor vehicle environment conditions are detected which can generally influence a cleaning process and/or a cleaning result of the viewing area. Particularly preferably, a plurality of sensors is disposed in the motor vehicle and/or the roof module for detecting these parameters. For instance, temperature sensors and/or humidity sensors and/or inclination sensors and/or GPS sensors and/or an air speed indicator and/or solar sensors, in particular light sensors, and/or particle sensors and/or speed sensors and/or gyro sensors and/or any other sensor can be implemented. Other environment parameters of a vehicle environment which are not explicitly listed and could influence cleaning the viewing area can be detected according to the invention.

In a preferred embodiment, the evaluation and control apparatus is configured to receive a plurality of sensor signals, to compare these with each other and/or to weight them against each other and/or to compare them with a corresponding predetermined threshold and/or limit interval in order to determine the operation situation in this manner. Preferably, the evaluation and control apparatus is configured to compare the at least one detected sensor signal with at least one predetermined threshold and/or at least one limit interval which is predetermined for the corresponding sensor signal or the physical parameter translated therein. Preferably, the individual sensor signals are processed in such a manner by the evaluation and control apparatus that an information-specific weighing with regard to an importance and/or an influence on the operation situation to be determined takes place. In other words, according to the invention, it is preferably weighted whether one or more sensor signals is more important compared to other detected sensor signals, since they have a greater influence on the operation situation and/or the cleaning during the operation situation. An evaluation of this kind is preferably carried out with a focus on cleaning, meaning sensor signals and/or parameters which have a greater influence on cleaning and/or the cleaning process and/or the cleaning result are preferably given a higher weighting when determining the operation situation. A weighting of this kind of the individual parameters can, for example, be predetermined and/or based on empirical values. Alternatively or additionally, it is also possible that algorithms for mapping an artificial intelligence, in particular algorithms for mapping an artificial neural network, for example a convolutional neural network (CNN), are used for such a weighting and/or inclusion and/or consideration of the detected sensor signals by the evaluation and control apparatus. Here, for example, algorithms can be used which, for example, learn a weighting and/or inclusion and/or consideration of the acquired sensor signals by means of labelled data sets which have been evaluated in advance by a skilled person. Other approaches from the field of machine learning, for example reinforcement learning, are also conceivable according to the invention. In other words, the evaluation and control apparatus is preferably designed as an AI engine which determines the corresponding operation situation from the detected at least one sensor signal using machine learning algorithms.

In a preferred embodiment, the evaluation and control apparatus is configured to compare the determined operation situation to a plurality of predetermined and/or previously determined operation situations, for each of which an in particular individual cleaning profile is predefined and/or associated and/or created, and to select preferably the cleaning profile of that predetermined and/or previously determined operation situation of the plurality of predetermined and/or previously determined operation situations which has the slightest deviation from the determined operation situation. The plurality of predetermined and/or previously determined operation situations are preferably stored in a database in conjunction with the corresponding predefined and/or associated and/or created cleaning profiles. For instance, the database comprises a listing of the plurality of operation situations to each of which a cleaning profile is associated, which preferably is adapted to the operation situation.

An operation situation can, for example, describe a parameter constellation consisting of several parameters, for example a first parameter x (for example a headwind speed), a second parameter y (for example solar radiation) and a third parameter y (for example a driving speed). The evaluation and control apparatus can be configured, for example, to compare the x, y and z values, in particular numerical values, in each case to at least one predetermined threshold $x_{Grenz}$, $y_{Grenz}$, $z_{Grenz}$ and/or a limit interval $\partial_{xGrenz}$, $\partial_{yGrenz}$, $\partial_{zGrenz}$ and, if necessary, to weight the parameters (for example x, y and z) with one another in order to detect the current operation situation $F_{Aktuell}(x, y, z)$ in this manner. Afterwards, the evaluation and control apparatus preferably compares the operation situation to other operation situations $F_1, \ldots, F_n$ in order to detect in this manner whether such an operation situation, in particular such a parameter constellation, for example x, y, z, has already been previously detected and/or predefined and/or recorded. If such a parameter situation has already been detected, i.e., is present as an entry in the database, the evaluation and control apparatus selects the cleaning profile stored for and/or associated with and/or predefined for this operation situation already present in the database in order to control the cleaning of the viewing area by means of the at least one cleaning nozzle based thereon. If the determined operation situation or parameter constellation was not (yet) available in the comparison database, the evaluation and control apparatus preferably determines an operation situation or parameter constellation that is most similar to the currently determined operation situation, in particular taking into account the individual parameter weighting(s). Mathematically speaking, an operation situation most similar to the current driving situation can be found, for example, by searching for a shortest vectorial distance between two points in an n-dimensional vector space, where n preferably defines the number of detected parameters included in the operation situation. In this case, the cleaning profile which is assigned to the operation situation determined to be the most similar is selected in order to control the cleaning of the viewing area by means of the at least one cleaning nozzle based thereon.

In a preferred embodiment, the at least one cleaning profile comprises at least one control command via which at least a discharge duration and/or a discharge pressure and/or a discharge amount and/or a discharge speed and/or a motion sequence and/or a discharge direction and/or a type of used cleaning fluid and/or a timing of a cleaning fluid discharge and/or a pulsing of the cleaning fluid discharge of the at least one cleaning nozzle is controllable. The cleaning profile is preferably also understood to be a cleaning program sequence. Generally, other cleaning parameters, such as switching a valve, be individualized via the control commands. A cleaning program sequence of this kind can preferably comprise a plurality of control commands which are preferably executed one after the other in a temporal order and command the at least one cleaning nozzle to clean the viewing area based on the corresponding control command. Preferably, a cleaning profile of this kind temporally limits a cleaning process and defines a predefined number of cleaning parameters, meaning each cleaning profile enables individually cleaning the viewing area. The individualized cleaning profiles enable an also individualized cleaning of the viewing area, in particular depending on the operation situation.

In a preferred embodiment, the evaluation and/or control apparatus is configured to store the determined operation situation together with the selected cleaning profile as a database entry, provided the determined operation situation is not comprised in the plurality of predetermined and/or previously determined operation situations. Particularly preferably, the determined operation situation is stored when a corresponding parameter constellation, via which the operation situation is preferably unambiguously described, is not available in the already existing database. In this manner, the database, which enables associating a cleaning profile with a corresponding operation situation, can be continuously expanded, meaning a more and more extensive dataset can be generated with each use of the cleaning apparatus according to the invention. This makes it possible to adapt the cleaning more and more precisely to the current operation situation, so that eventually an optimal cleaning profile can be retrieved from the database for any operation situation.

In a preferred embodiment, the evaluation and/or control apparatus is configured to receive at least one inspection sensor signal, to determine an in particular partially selective degree of quality of the cleaning of the viewing area, and to decide based on the determined degree of quality whether a cleaning was effective based on the cleaning profile selected for the determined operation situation, and in the event that the cleaning was not effective, to modify the cleaning profile selected for the determined operation situation and to assign it as a inspected cleaning profile in order to effect a cleaning based on the modified cleaning profile when detecting the same or a similar operation situation in the future. In other words, the evaluation and control device is preferably configured to inspect the quality of the cleaning, i.e. the degree of quality, after cleaning has been carried out, in order to obtain information on whether a satisfactory cleaning effect could be achieved with the cleaning profile selected in particular from the database for the determined operation situation or whether dirt has remained on the viewing area after carrying out the selected cleaning profile or cleaning program. Particularly preferably, the inspection sensor signal is detected by the sensor looking through the viewing area to be cleaned and transmitted to the evaluation and control apparatus, in particular via one or more cables or wirelessly. Particularly preferably, the degree of quality can be determined individually for individual sections in the field of view of the corresponding sensor in order to determine whether, and if so in which of the sections, residual dirt has remained after cleaning. If, for example, it is determined that residual dirt has remained only partially on the viewing area, the previously selected cleaning profile can be adapted, for example, by adding a control command to the previously selected cleaning profile for controlling a drive mechanism by which the at least one cleaning nozzle can be moved, the control command causing the at least one cleaning nozzle to spray more cleaning fluid in the direction of this partial section of the viewing area when the cleaning profile is carried out again.

In a preferred embodiment, the evaluation and control apparatus is configured to detect the degree of quality selectively for predetermined areas of the at least one viewing area in each instance based on the inspection sensor signal. For instance, it is possible to inspect the degree of quality or the quality of cleaning only in a main field of view of the (environment) sensor and to omit in particular edge areas of the field of view during inspection. This can be of advantage in particular regarding the computing and evaluation speed, as not the entire field of view of the environment sensor has to be inspected for any remaining dirt. Particularly preferably, the cleaning quality is inspected directly after cleaning has taken place if possible, in particular after the selected cleaning profile has been terminated so that interfering variables are not erroneously detected due to new contamination. In other words, it is preferred when the cleaning effect is inspected via the evaluation of inspection sensor signals in order to adaptively, in particular iteratively, create an optimal sequence or an optimal cleaning profile for each operation situation and to preferably store this in the event in which the operation situation reoccurs in the same or similar fashion.

In a preferred embodiment, the evaluation and control apparatus is configured to replace the selected cleaning profile with a different predetermined cleaning profile and/or to modify at least one parameter of the selected cleaning profile in order to obtain the modified cleaning profile. In other words, the cleaning profile previously selected on the basis of the determined operation situation is modified after the quality control after the cleaning has taken place or is replaced with a different cleaning profile, which is already available in the database, for example, when no satisfactory cleaning result has been achieved with the cleaning based on the selected cleaning profile. In other words, the cleaning profile stored in the database for the corresponding operation situation is modified and/or replaced and/or overwritten. In this manner, automatic optimization regarding a future cleaning sequence and thus in particular an adaptive cleaning is possible. For instance, in the event in which a similar or the same operation situation is detected anew, an optimized cleaning profile is selected in particular from the modified and/or overwritten database, via which a satisfactory cleaning of the viewing area is made possible. Implementing an inspection and modification multiple times is also possible according to the invention. This automatic optimization and/or self-inspection can preferably be implemented in the evaluation and control apparatus according to the invention by using algorithms from machine learning. In this context, the description above is referred for more information on machine learning.

Of course, the embodiments and the exemplary embodiments mentioned above and yet to be discussed below can be realized not only individually but also in any combination with each other without departing from the scope of the present invention. Moreover, any and all embodiments and exemplary embodiments also relate to a roof module according to the invention in an equivalent or at least similar manner without having to be explicitly mentioned for each instance.

BRIEF DESCRIPTIONS OF THE DRAWINGS

Embodiments of the invention are shown schematically in the drawings and are described in more detail in the following.

DETAILED DESCRIPTION

Figure 1:
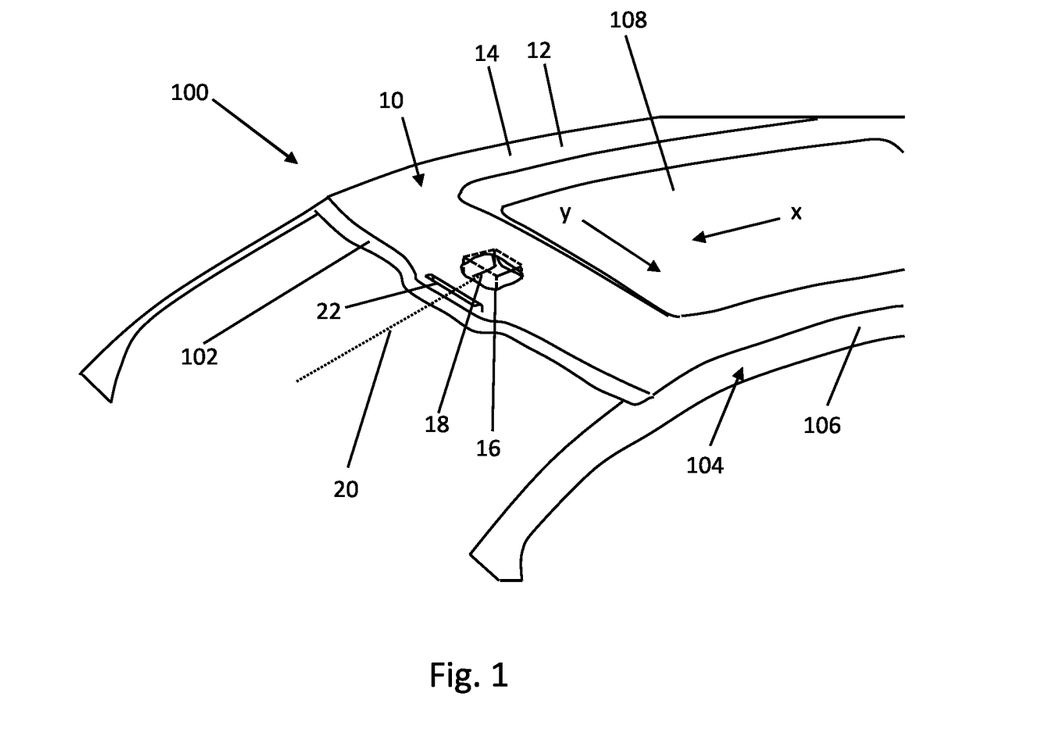
FIG. 1 shows a schematic view of a motor vehicle having a vehicle chassis and a roof module having a cleaning apparatus according to the invention.

In FIG. 1, a vehicle roof 100 comprising a roof module 10 is shown. Roof module 10 comprises a panel component 12 for forming a roof cladding 14 of vehicle roof 100 of a vehicle (not shown in its entirety). In a front area of vehicle roof 100 or roof module 10, viewed in a longitudinal vehicle direction x, an environment sensor 16 is disposed symmetrically to a longitudinal vehicle axis x. Environment sensor 16 is disposed directly behind a front transverse beam 102, which defines a roof header of the vehicle. Roof module 10 is preferably disposed as a structural unit in a roof frame 104 of the vehicle or placed on top of two transverse beams 102 and two longitudinal beams 106, via which roof frame 104 is formed. Roof module 10 in the shown exemplary embodiment has a panoramic roof 108.

Environment sensor 16 looks through a viewing area 18 provided on a casing 17 of environment sensor 16. Alternatively or additionally, a viewing area 18 of this kind can be disposed on panel component 12 or be formed by it. Viewing area 18 can be made of a preferably shatter-proof plastic or glass or a different (partially) transparent material, for example. According to FIGS. 1 and 2, environment sensor 16 including its casing 17 is extractable and retractable in an opening of roof cladding 14; the used drive mechanism will not be described in more detail. Environment sensor 16 at hand is a lidar sensor which can transmit and/or receive electromagnetic signals for charting the vehicle environment via viewing area 18. Different sensor types, such as (multidirectional) cameras, ultrasonic sensors, laser sensors, radar sensors, can also be used. Environment sensor 16 is oriented along an optical axis 20 which is oriented parallel to longitudinal vehicle direction x in the case of FIG. 1. Environment sensor 16 has a field of view 21 which extends essentially in a cone shape around optical axis 20 and within which environment sensor 16 can chart the environment of the vehicle. Field of view 21 is shown schematically in FIG. 2 by means of dashes.

Figure 2:
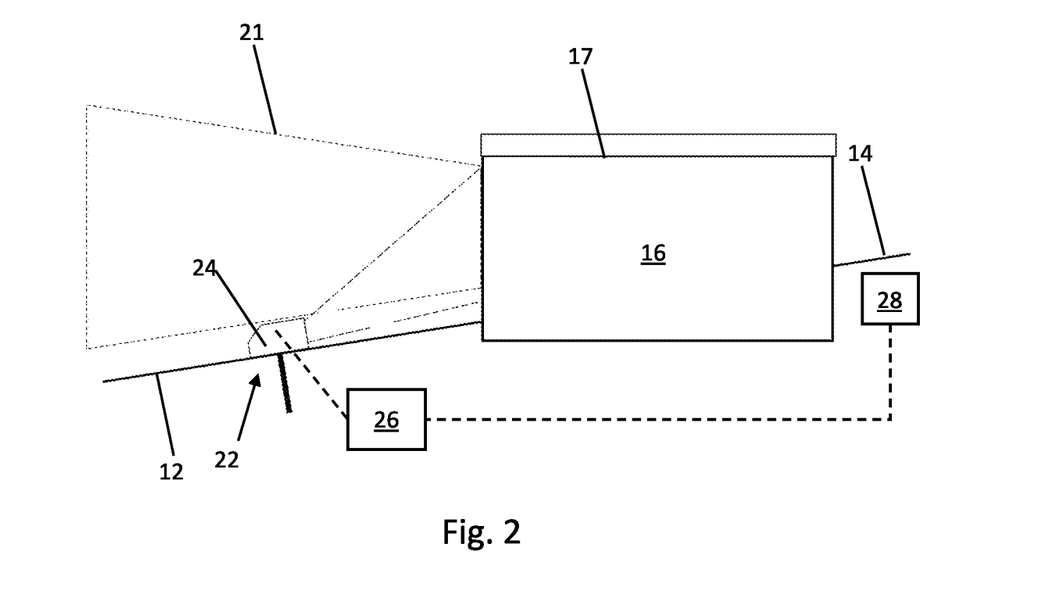
FIG. 2 shows an exemplary embodiment of a cleaning apparatus according to the invention.

Exemplarily, a cleaning apparatus 22 is disposed on panel component 12. Cleaning apparatus 22 comprises at least one cleaning nozzle 24 and an evaluation and control apparatus 26. Evaluation and control apparatus 26 in this case is connected to the at least one cleaning nozzle 24 via one or more cables or wirelessly. For this reason, evaluation and control apparatus 26 is preferably configured to transmit at least one control command, preferably a plurality of control commands preferably comprised in a program sequence, to the at least one cleaning nozzle 24, the control command causing cleaning nozzle 24 to execute a predetermined action defined by the control command. Furthermore, roof module 10 and/or the vehicle comprises at least one measuring sensor 28. Measuring sensor 28 is configured to record at least one sensor signal, which comprises at least one piece of information on a motor vehicle environment condition and/or a motor vehicle parameter. Preferably, roof module 10 and/or the vehicle comprises a plurality of in particular different measuring sensors. The at least one measuring sensor 28 is preferably connected communicatively to evaluation and control apparatus 26 via one or more cables, meaning the at least one sensor signal can be received via evaluation and control apparatus 26.

Evaluation and control apparatus 26 is configured to evaluate at least one sensor signal in order to determine an operation situation in this manner, to select a predetermined cleaning profile from a plurality of cleaning profiles based thereon, and to control the at least one cleaning nozzle 24 depending on the chosen cleaning profile in order to clean the at least one viewing area 18.

Figure 3:
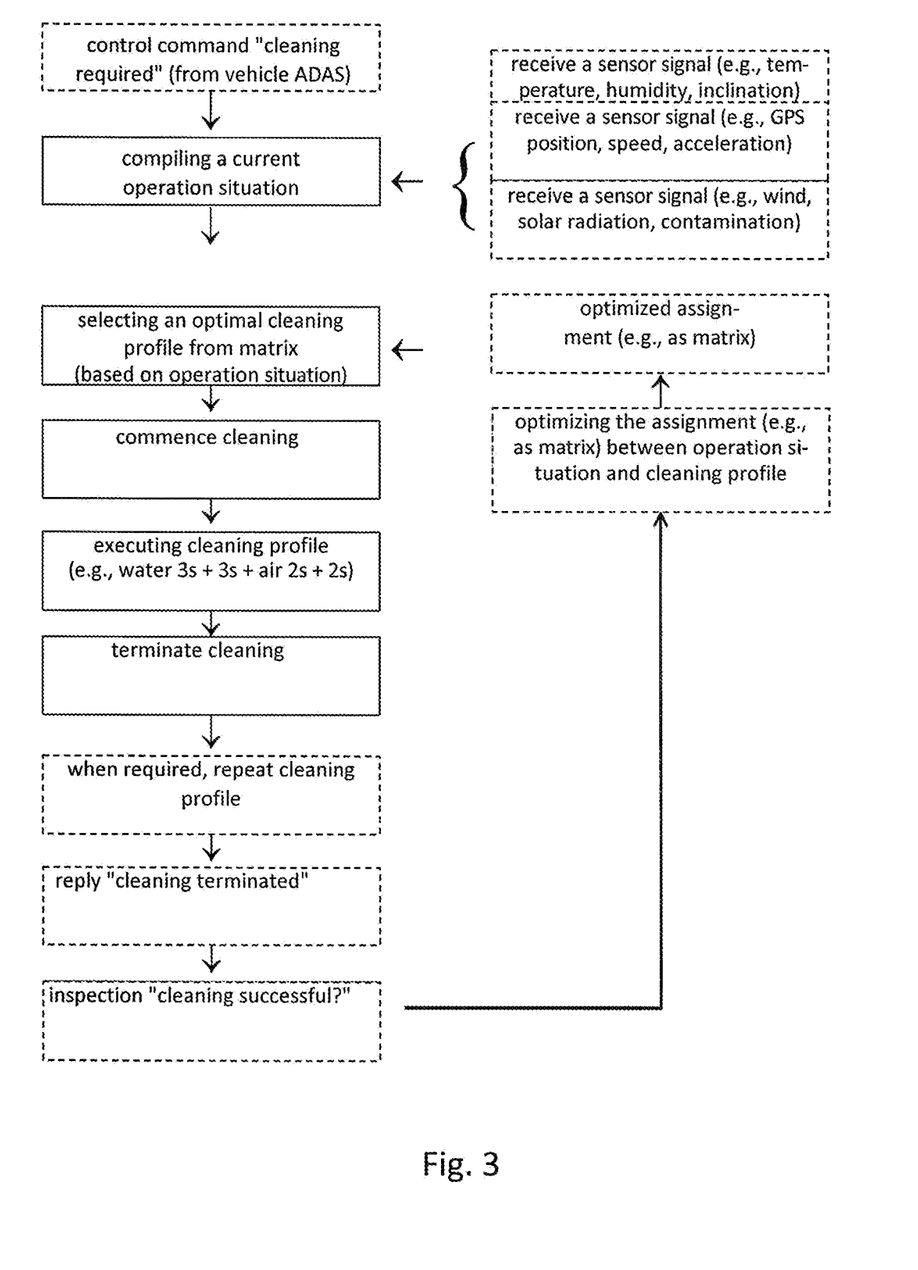
FIG. 3 shows a flow chart of an exemplary embodiment of the method according to the invention.

FIG. 3 shows an exemplary embodiment of the method according to the invention, by means of which the functionality of cleaning apparatus 22 according to the invention is explained exemplarily once more. Only optional steps are indicated by dashes around the corresponding boxes. At the beginning of the method, it can be indicated to the occupant, for example, that viewing area 18 requires cleaning. This indication can also take place inside the software by, for example, evaluation and control apparatus 26, which can be realized as an advanced driver assistance system (ADAS), determining upon evaluation that at least some contamination within field of view 21 is present on viewing area 18 which impairs the charting precision of environment sensor 16. A contamination of this kind can occur as a dark spot or shadow in the sensor measuring image, for example. The control command "cleaning required" generated in particular by the software can preferably cause the method, which is executed by evaluation and control device 26, to be activated. In this case, evaluation and control apparatus carries out the following steps, in particular by means of a processor: receiving at least one sensor signal which comprises at least one piece of information on a motor vehicle environment condition and/or a motor vehicle parameter; evaluating the at least one sensor signal in order to register an operation situation in this manner. These two steps are comprised in the flow chart exemplarily in step "compiling a current operation situation". Afterward, a selection of a predetermined cleaning profile from a plurality of predefined cleaning profiles based on the determined operation situation is undertaken. This step is described in FIG. 3 exemplarily as "selecting an optimal cleaning profile from matrix (based on operation situation)". Subsequently, a controlling of at least one cleaning nozzle 24 depending on the selected cleaning profile in order to clean the at least one viewing area 18 in this manner. The step controlling is divided exemplarily in three sub-steps "commence cleaning", "cleaning profile is executed" and "terminating cleaning".

Each cleaning profile preferably comprises a control command for commencing cleaning and control command for terminating cleaning and at least one control command via which an action of the at least one cleaning nozzle 24 is triggered. In the example of FIG. 3, the cleaning profile comprises at least the following control commands: commence cleaning, spray water for 3 seconds (3 s), pause, spray water for 3 seconds (3 s), pause, spray air for 2 seconds (2 s), pause, spray air for 2 seconds (2 s), terminate cleaning. Optionally, the cleaning profile or the cleaning program represented by the cleaning profile can be repeated if, for example, heavy contamination of viewing area 18 has been registered and, if possible, the operation situation allows providing information on whether the dirt adheres to viewing area 18, since strong solar radiation has been measured by the sensor, for example, which allows indicating that the dirt has most likely "baked" onto viewing area 18. Optionally, a reply in particular in the software indicating that the cleaning or the cleaning program has been terminated. Optionally, though preferred by the invention, an inspection can take place to provide information on whether the cleaning selected by the cleaning profile was successful. In this context, it is preferably inspected whether viewing area 18 was cleaned entirely or whether dirt residue remains which could not be removed by the cleaning based on the selected cleaning profile. For this purpose, preferably a degree of quality of the cleaning is determined. This degree of quality can preferably be determined partially, i.e., divided into individual areas of viewing area 18. If it is determined that the cleaning based on the selected cleaning profile was not successful, the previously selected cleaning profile can be modified to the extent that its cleaning effect is intensified in the future. Alternatively, a cleaning profile which for example is already available in an existing database and whose intensified cleaning effect is known can be newly assigned to the determined operation situation. This new assignment is preferably stored as a new database entry or adapted to the operation database entry existing on the determined operation situation or overwritten, meaning an optimized cleaning is enabled in the future when the same or a similar operation situation based on the optimized and/or modified cleaning profile reoccurs.

The invention claimed is:

1. A cleaning apparatus for cleaning at least one viewing area of a motor vehicle, the cleaning apparatus comprising:
at least one cleaning nozzle and an evaluation and control apparatus,
wherein the evaluation and control apparatus is configured to
receive at least one sensor signal which comprises at least one piece of information on a motor vehicle environment condition and/or a motor vehicle parameter,
to evaluate this at least one piece of information in order to determine an operation situation in this manner,
to select a predetermined cleaning profile from a plurality of predefined cleaning profiles based on this at least one piece of information,
to control the at least one cleaning nozzle depending on the selected cleaning profile in order to clean the at least one viewing area
to compare the determined operation situation to a plurality of predetermined and/or previously determined operation situations, for each of which an individual cleaning profile is predefined, and
to select preferably the cleaning profile of that predetermined and/or previously determined operation situation of the plurality of predetermined and/or previously determined operation situations which has the slightest deviation from the determined operation situation;
wherein the evaluation and control apparatus is further configured
to receive at least one inspection sensor signal,
to detect a partially selective degree of quality of the cleaning of the viewing area, and
to decide based on the determined degree of quality whether a cleaning was effective based on the cleaning profile selected for the determined operation situation, and
in the event that the cleaning was not effective, to modify the cleaning profile selected for the determined operation situation in order to effect a cleaning based on the modified cleaning profile when detecting the same or a similar operation situation in the future.

2. The cleaning apparatus according to claim 1, wherein the at least one piece of information of the at least one sensor signal is selected from the group consisting of ambient temperature, ambient humidity, surrounding topography, wind speed, wind direction, intensity of solar radiation, aerosol concentration, geographical position, motor vehicle speed, and motor vehicle acceleration.

3. The cleaning apparatus according to claim 1, wherein the evaluation and control apparatus is configured to receive a plurality of sensor signals, to compare these with each other and/or to weight them against each other and/or to compare them to a corresponding predetermined threshold value and/or limit interval in order to determine the operation situation in this manner.

4. The cleaning apparatus according to claim 1, wherein the at least one cleaning profile comprises at least one control command via which at least a discharge duration and/or a discharge pressure and/or a discharge amount and/or a discharge speed and/or a type of used cleaning fluid and/or a timing of cleaning fluid discharge and/or a pulsing of the cleaning fluid discharge of the at least one cleaning nozzle is controllable.

5. The cleaning apparatus according to claim 1, wherein the evaluation and control apparatus is configured to control at least a discharge pressure and/or a discharge amount and/or a discharge speed and/or a movement sequence and/or a discharge direction and/or a type of used cleaning fluid and/or a timing of a cleaning fluid discharge and/or a pulsing of the cleaning fluid discharge of the at least one cleaning nozzle depending on the selected cleaning profile.

6. The cleaning apparatus according to claim 1, wherein the evaluation and control apparatus is configured to store the determined operation situation together with the selected cleaning profile as a database entry, provided the determined operation situation is not comprised in the plurality of predetermined and/or previously determined operation situations.

7. The cleaning apparatus according to claim 1, wherein the evaluation and control apparatus is configured to determine the degree of quality selectively for each predetermined area of the at least one viewing area based on the inspection sensor signal.

8. The cleaning apparatus according to claim 1, wherein the evaluation and control apparatus is configured to replace the selected cleaning profile with a different predetermined cleaning profile and/or to modify at least one parameter of the selected cleaning profile to obtain the modified cleaning profile.

9. A roof module for forming a vehicle roof on a motor vehicle having: a panel component, which forms at least sections of a roof cladding of the vehicle roof, the roof cladding functioning as an outer sealing surface of the roof module, the motor vehicle having at least one environment sensor which is configured to transmit and/or to receive electromagnetic signals via a viewing area to chart a vehicle environment in this manner, and at least one cleaning apparatus according to claim 1 which is configured to clean the viewing area.

10. A motor vehicle having: a vehicle chassis and a roof module according to claim 9, which is disposed on the vehicle chassis as a structural unit.

11. A method for cleaning a viewing area of a motor vehicle, the method comprising the following steps: providing the cleaning apparatus of claim 1;
   receiving at least one sensor signal which comprises at least one piece of information on a motor vehicle environment condition and/or a motor vehicle parameter;
   evaluating the at least one sensor signal in order to determine an operation situation in this manner;
   selecting a predetermined cleaning profile from a plurality of predefined cleaning profiles based on the determined operation situation; and
   controlling at least one cleaning nozzle depending on the selected cleaning profile in order to clean the at least one viewing area in this manner.

* * * * *